3,232,928
WATER-INSOLUBLE DISAZO UREA DYES
Hans Baumann and Dieter Leuchs, Ludwigshafen (Rhine), Germany, assignors to Badische Anilin- & Soda-Fabrik Aktiengesellschaft, Ludwigshafen (Rhine), Germany
No Drawing. Filed Feb. 8, 1963, Ser. No. 257,083
Claims priority, application Germany, Feb. 16, 1962, B 65,971; Oct. 20, 1962, B 69,317
3 Claims. (Cl. 260—175)

This invention relates to water-insoluble azo dyes having the general Formula I:

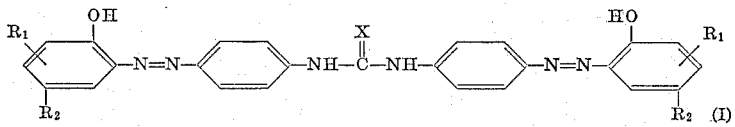

in which X denotes an oxygen atom or a sulfur atom, $R_1$ denotes a hydrogen atom, a halogen atom, an alkyl radical or an acylamino radical and $R_2$ denotes a halogen atom, an alkyl radical or an acylamino radical, and to a process for the production of such dyes. The invention also relates to materials, such as sheets, films and textile materials of cellulose esters, synthetic polyamides, polyurethanes and linear polyesters which have been dyed and/or printed with the said dyes.

We have found that the said new water-insoluble azo dyes are obtained by coupling tetrazotized 4,4′-diaminodiphenylurea or 4,4′-diaminodiphenylthiourea with phenols of the general Formula II:

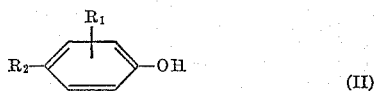

in which $R_1$ and $R_2$ have the meanings given above.

Examples of phenols of the Formula II which are suitable for the process are: 1-hydroxy-4-methylbenzene, 1-hydroxy-4-tertiary-butylbenzene, 1-hydroxy-2,4-dimethylbenzene, 1-hydroxy-2,4-di-tertiary-butylbenzene, 1-hydroxy-4-chlorobenzene, 1-hydroxy-4-bromobenzene, 1-hydroxy-4-acetaminobenzene, 1 - hydroxy-2-acetamino-4-methylbenzene, 1-hydroxy-4-carbomethoxyaminobenzene and 1-(4-hydroxyphenyl)-pyrrolidone.

If coupling of tetrazotized 4,4′-diaminodiphenylurea or of 4,4′-diaminodiphenylthiourea is carried out with a mixture of different phenols of the general Formula II, dyes are obtained which consist of mixtures of symmetrical compounds of the general Formula I with compounds of the general Formula I in which the two radicals $R_1$ and/or the two radicals $R_2$ are different from each other.

The new dyes are suitable in finely divided form for dyeing and/or printing materials, such as sheets, films and textile materials, for example fibers, threads, filaments, flock, woven fabrics and knitted fabrics of cellulose esters, synthetic polyamides, polyurethanes and linear polyesters, such as polyethylene terephthalate.

The new dyes give yellow dyeings and prints having very good wet fastness properties and exhibiting excellent resistance to heat treatments, such as ironing, dry-heat pleating and setting. The fastness to light of the dyeings and prints is also excellent.

Such dyeings are obtained for example by dyeing polyester textile material at temperatures of 90° to 100° C. or under superatmospheric pressure at temperatures above 100° C. and in addition to the conventional dyeing auxiliaries there may be added to the dyebath to increase the rate of absorption, dyeing accelerators, such as o- and p-phenylphenol, o-hydroxybenzoic acid and methyl o-hydroxybenzoate. Prints of the said kind are obtained for example by using the dyes with thickening agents and if desired with conventional printing auxiliaries and the said dyeing accelerators, the printed material being treated for a short time with steam or hot air. Dyeings and prints obtainable with the dyes according to this invention may be discharged white by conventional methods.

The invention is further illustrated by the following examples, in which parts, unless stated otherwise, are by weight. Parts by volume have the same relation to parts by weight as the liter to the kilogram.

*Example 1*

484 parts of 4,4′-diaminodiphenylurea is dissolved in 1000 parts by volume of 10 N-hydrochloric acid with the addition of 6000 parts of water. 6000 parts of ice is added to the solution and then an aqueous solution of 276 parts of sodium nitrite is added in small portions while stirring. The diazonium salt solution thus obtained is allowed to flow slowly while stirring into a solution consisting of 432 parts of 1-hydroxy-4-methylbenzene, 160 parts of sodium hydroxide, 212 parts of sodium carbonate and 2000 parts of water. Coupling is complete after a short time. The deposited dye is filtered off and washed on the filter with water. The moist filter cake, containing 910 parts of the dye having the formula:

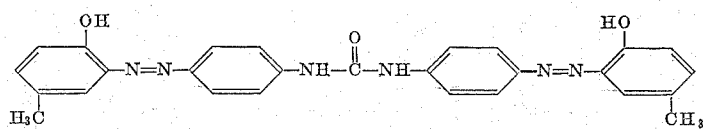

is dispersed in the conventional way with 1370 parts of the condensation product derived from naphthalene-2-sulfonic acid and formaldehyde.

100 parts of polycaprolactam fabric is dyed for 90 minutes at 95° to 100° C. with a liquor containing in 2000 parts of water 1 part of the finely divided dye prepared as described above and 3 parts of the reaction product of 1 mole of castor oil with 40 moles of ethylene oxide. A yellow dyeing is obtained which has very good light fastness and excellent wet fastness properties.

By using 516 parts of 4,4′-diaminodiphenylthiourea in this example instead of 484 parts of 4,4′-diaminodiphenylurea, and proceeding otherwise as described above, 935 parts of a dye having the formula:

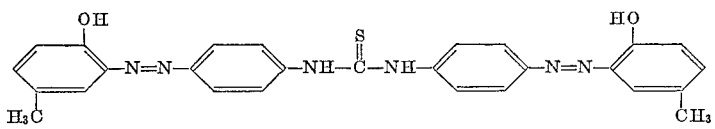

is obtained which dyes fibres of polyamide or polyethylene terephthalate somewhat more reddish yellow shades.

The following yellow dyes are obtained in an analogous way:

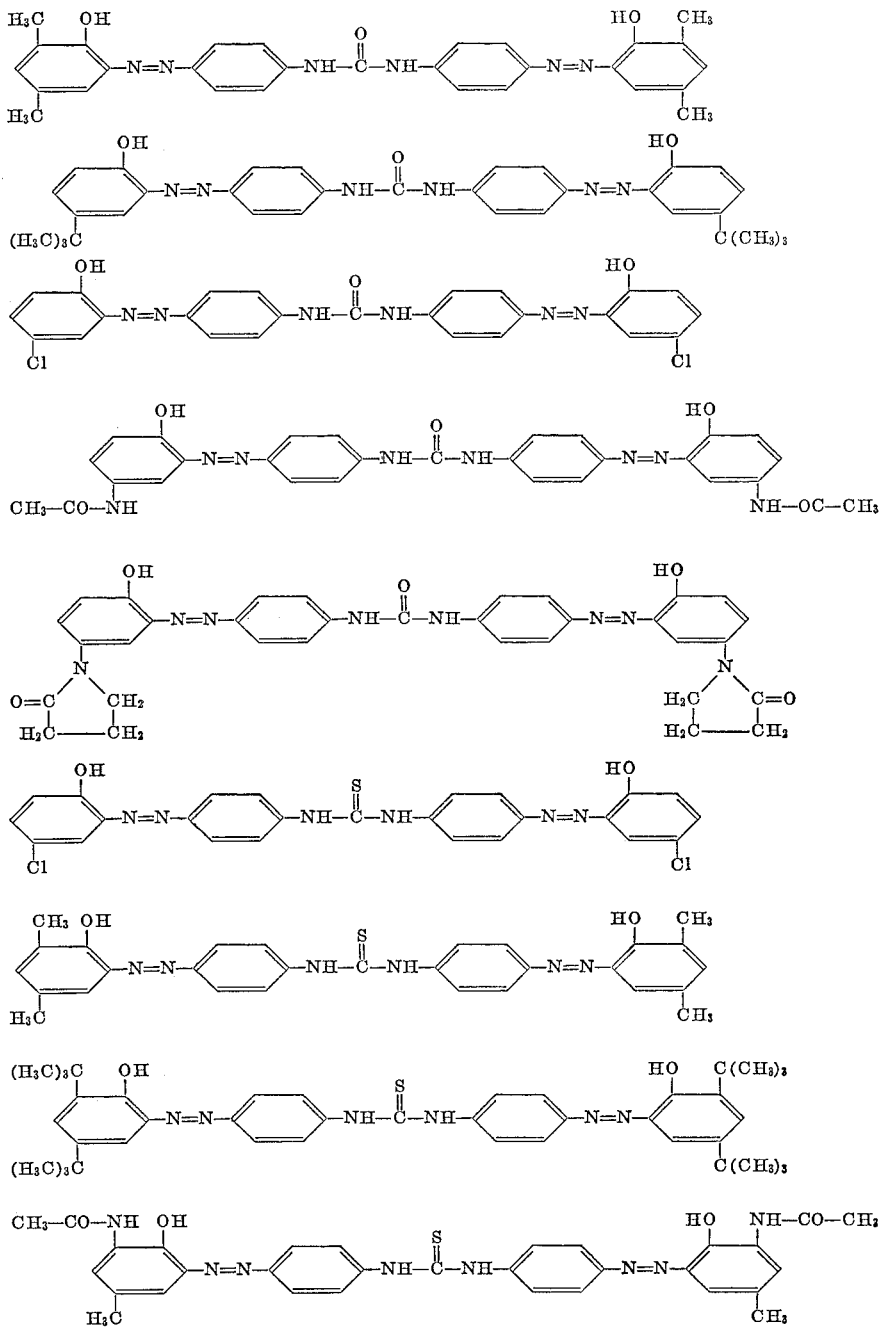

parts of water. The solution is mixed with 1500 parts of ice and then diazotized with an aqueous solution of 69 parts of sodium nitrite. The diazonium salt solution is then slowly poured while stirring into a solution of 54 parts of 1-hydroxy-4-methylbenzene, 76 parts of 1-hydroxy-4-acetamino-benzene, 40 parts of sodium hydroxide and 53 parts of sodium carbonate in 600 parts of water. When coupling has ended, the dye formed is filtered off

*Example 2*

121 parts of 4,4'-diaminodiphenylurea is dissolved with 250 parts by volume of 10 N-hydrochloric acid and 1500 with suction and washed with water. 250 parts of a mixture of the following dyes is obtained:

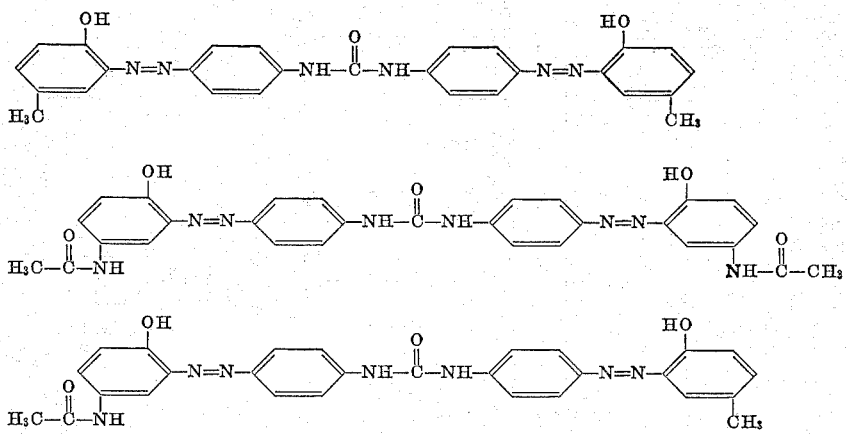

which can be dispersed without previous drying by kneading it with 375 parts of the condensation product derived from naphthalenesulfonic acid and formaldehyde. The dye formulation thus obtained dyes fibers of polyamide or polyethylene terephthalate full reddish yellow shades.

*Example 3*

A diazonium salt solution prepared from 242 parts of 4,4'-diaminodiphenylurea by the process of Example 1 is slowly poured with stirring into a solution consisting of 108 parts of 1-hydroxy-4-methylbenzene, 122 parts of 1-hydroxy-3,4-dimethylbenzene, 80 parts of sodium hydroxide, 106 parts of sodium carbonate and 1500 parts of water. Coupling is complete after a short time. The deposited dye is filtered off by suction and washed with water until the washing water is neutral. 420 parts of a mixture of the following dyes is obtained:

Yellow dyes may also be prepared in an analogous way from the components set out in the following table; these dyes are also suitable for dyeing polyamide and polyester fibers:

| Diazo component | 1st coupling component | 2nd coupling component |
| --- | --- | --- |
| 4,4'-diaminodiphenylurea. | 1-hydroxy-4-methylbenzene. | 1-(4-hydroxyphenyl)-pyrrolidone. |
| Do | 1-hydroxy-4-chlorobenzene. | 1-hydroxy-4-acetylaminobenzene. |
| Do | 1-hydroxy-4-methylbenzene. | 1-hydroxy-4-carbomethoxy-aminobenzene. |
| Do | 1-hydroxy-3,4-dimethylbenzene. | 1-hydroxy-4-acetylaminobenzene. |
| Do | 1-hydroxy-2,4-dichlorobenzene. | 1-hydroxy-3,4-dimethylbenzene. |
| 4,4'-diaminodiphenylthiourea. | 1-hydroxy-4-methylbenzene. | 1-hydroxy-4-acetylaminobenzene. |
| Do | ...do... | 1-hydroxy-3,4-dimethylbenzene. |

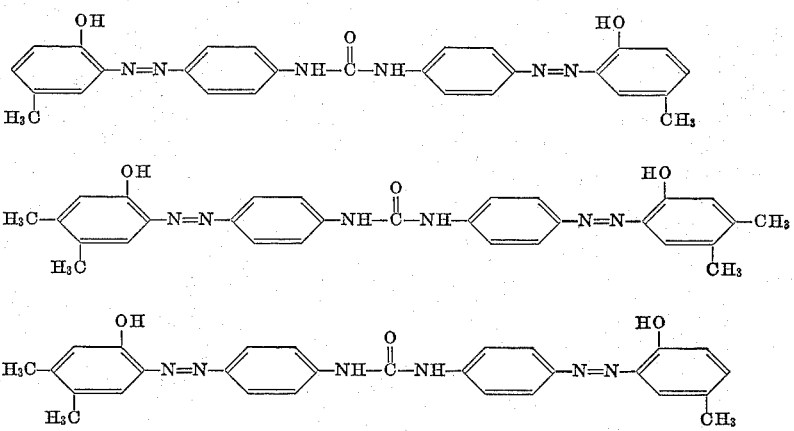

The dye mixture dyes polyamide fibers clear and fast yellow shades.

We claim:
1. A water-insoluble azo dye of the formula:

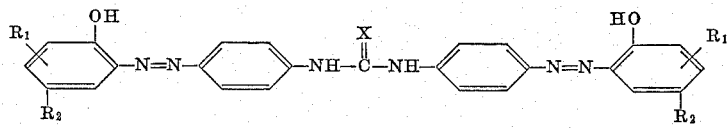

where X is an atom selected from the group consisting of oxygen and sulfur, $R_1$ is a substituent selected from the group consisting of hydrogen, lower alkyl, acetylamino, carbomethoxyamino and pyrrolidone, and $R_2$ is a substituent selected from the group consisting of halogen, lower alkyl, acetylamino, carbomethoxyamino and pyrrolidone, with the proviso that $R_1$ is substituted in one of the positions meta and para to the azo group and with the further proviso that each phenol group contains not more than one of said acetylamino, carbomethoxyamino and pyrrolidone substituents.

2. The dye of the formula:

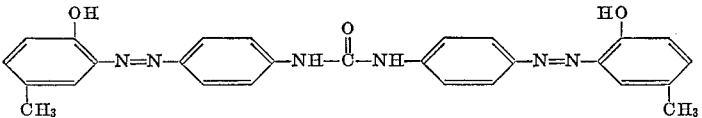

3. The dye of the formula:

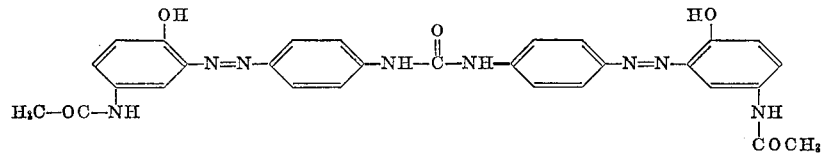

References Cited by the Examiner
UNITED STATES PATENTS

| | | | |
|---|---|---|---|
| 430,533 | 6/1890 | Muller | 260—175 |
| 2,673,199 | 3/1954 | Widmer et al. | 260—149 XR |
| 2,936,305 | 5/1960 | Forter | 260—175 |

CHARLES B. PARKER, *Primary Examiner.*

IRVING MARCUS, *Examiner.*